United States Patent [19]

Schade

[11] 4,060,096

[45] Nov. 29, 1977

[54] VENTILATOR VALVE

[76] Inventor: Max Gunter Schade, Parkstrasse 36, Bensberg, Germany, 5060

[21] Appl. No.: 699,625

[22] Filed: June 25, 1976

[30] Foreign Application Priority Data

| | | |
|---|---|---|
| July 2, 1975 | Germany | 2529579 |
| Nov. 27, 1975 | Germany | 2553364 |

[51] Int. Cl.[2] ...................... F16K 13/04; F16K 17/40

[52] U.S. Cl. ...................................... 137/74; 137/77; 126/287.5; 169/42; 251/301; 251/303

[58] Field of Search .................. 236/49; 251/300–304; 298/1, 86; 126/287.5; 169/42; 137/72, 74–77

[56] References Cited

U.S. PATENT DOCUMENTS

| | | | |
|---|---|---|---|
| 795,840 | 8/1905 | Klein | 137/72 X |
| 1,774,395 | 8/1930 | Murray | 137/77 |
| 3,538,929 | 11/1970 | Botkin | 137/77 |
| 3,633,600 | 1/1972 | Sadamori | 137/77 |
| 3,825,182 | 7/1974 | Bauchmann | 236/49 X |

*Primary Examiner*—William E. Wayner
*Assistant Examiner*—William E. Tapolcai, Jr.
*Attorney, Agent, or Firm*—Jerome P. Bloom

[57] ABSTRACT

The ventilator valve of the invention includes a housing incorporating a plate portion having an aperture forming at least part of a passage for air to flow through the housing. This plate portion forms a base adjacent to which a valve plate is rotatably mounted, in a plane substantially parallel thereto. A ring-like member is fixed to said base plate to dispose adjacent the outer periphery of the valve plate. This ring member embodies means defining a plurality of circularly spaced recesses in which a locking element on the valve plate may be selectively engaged. The engagement of the locking element in one of said circularly spaced recesses causes the valve plate to be in a valve-open position, in which position it is clear of at least a portion of the aperture in said plate portion of the housing. The locking element embodies means arranged to respond to a predetermined temperature level of its environment to disable the engaged relation thereof to said ring member, in which event said valve plate is caused to move, under the influence of either of biasing means or gravity, to a valve-closed position in which it seals the aperture in the base plate and thereby closes the flow passage which is normally provided through said housing.

26 Claims, 7 Drawing Figures

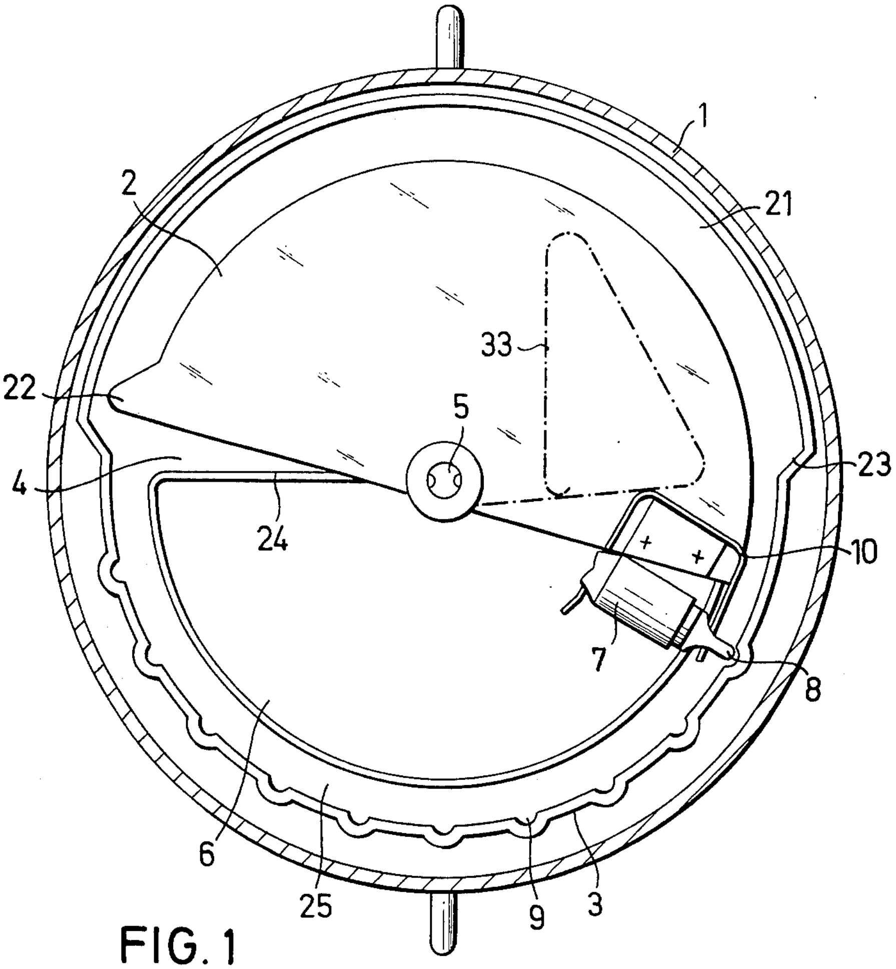
FIG. 1
FIG. 2
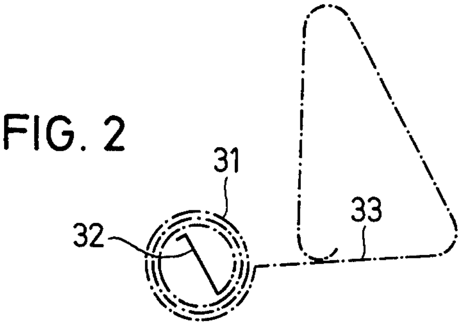

VENTILATOR VALVE

BACKGROUND OF THE INVENTION:

This invention relates to improvements in ventilator valves of the type illustrated in German Publication DT-PS 23 22 913. While prior art valves of this nature will generally serve their basic purpose, they are not fully satisfactory in all respects. Their design does not necessarily insure an optimally tight closure of their flow passage when the same is necessary, as when the excessive temperature of their environment so demands. Nor are such prior art valves designed to automatically function to achieve a valve closed condition irrespective of their installation position. These and other problems evidenced in use of the prior art valves are solved by the present invention.

SUMMARY OF THE INVENTION:

A preferred embodiment of the invention comprises a housing wherein means define a passage for flow therethrough of air, which means includes a plate having a single aperture forming part of the flow passage, in respect to which an adjacent valve plate may be rotated to selectively uncover a selected portion of said aperture or achieve a complete seal thereof. Rimming a portion of the valve plate, and in fixed relation to said housing, is an arcuately configured wall structure formed to be selectively engaged at circularly spaced locations thereon by a locking means provided in connection with the valve plate. The locking means embodies means arranged to respond to its exposure to a predetermined temperature to automatically provide a disengagement of said locking means from said arcuately configured wall structure. In the event of such occurrence biasing means or gravity may be utilized, in connection with the valve plate, to provide that the valve plate will move, automatically to seal the said aperture forming part of the flow passage through the valve housing.

Preferred embodiments of the invention further include means which urge said valve plate to positively seal the flow passage through said housing when it overlies said aperture.

Thus, in utilizing preferred embodiments of the invention it will be found that irrespective of their installation position their flow passage will be optimally sealed as and when required. Moreover, the seal effected will be maintained.

In a particularly advantageous embodiment of the invention the valve housing is bridged by a pair of axially spaced plate portions each of which has an aperture forming part of the flow passage through the housing and these apertures are circularly offset, substantially 180°, to provide thereby that the ventilator valve does not in the use thereof become a source of undesirable noise.

Special advantage is found in those invention embodiments wherein the valve plate has a disc form and embodies an aperture which is located inwardly of and in spaced relation to its outer peripheral edge. This enables that the full outer peripheral edge of the valve plate may be positioned to bear on an adjacent plate having an aperture with respect to which it serves a valving function. Such an arrangement insures a balanced and good function of the valve plate when it is required to automatically move to a closed position.

It is accordingly a primary aim and achievement of the present invention that it produces a ventilator valve which is economical to manufacture, more efficient and satisfactory in use and unlikely to malfunction.

Another object of the invention is to provide a ventilator valve of the type herein described wherein there will be provided an automatic seal of its flow passage, when dictated by its environment, irrespective of the installation position of the valve.

An additional object of the invention is to provide a valve of the type described wherein biasing means is provided for the valve plate which positively functions to achieve a valve closed condition thereof irrespective of the orientation of the axis about which the valve plate is adapted to rotate.

A further object of the invention is to provide a ventilator valve possessing the advantageous structural features, the inherent meritorious characteristics and the means and mode of use herein described.

With the above and other incidental objects in view as will more fully appear in the specification, the invention intended to be protected by Letters Patent consists of the features of construction, the parts and combinations thereof, and the mode of operations as hereinafter described or illustrated in the accompanying drawings, or their equivalents.

Referring to the drawings, wherein some but not necessarily the only forms of embodiment of the invention are illustrated schematically, FIG. 1 shows a plan view of a ventilator valve providing a first embodiment of the invention, FIG. 2 shows the details of a spiral spring included in the structure of FIG. 1;

Like parts are indicated by similar characters of reference throughout the several views.

Figure 3:
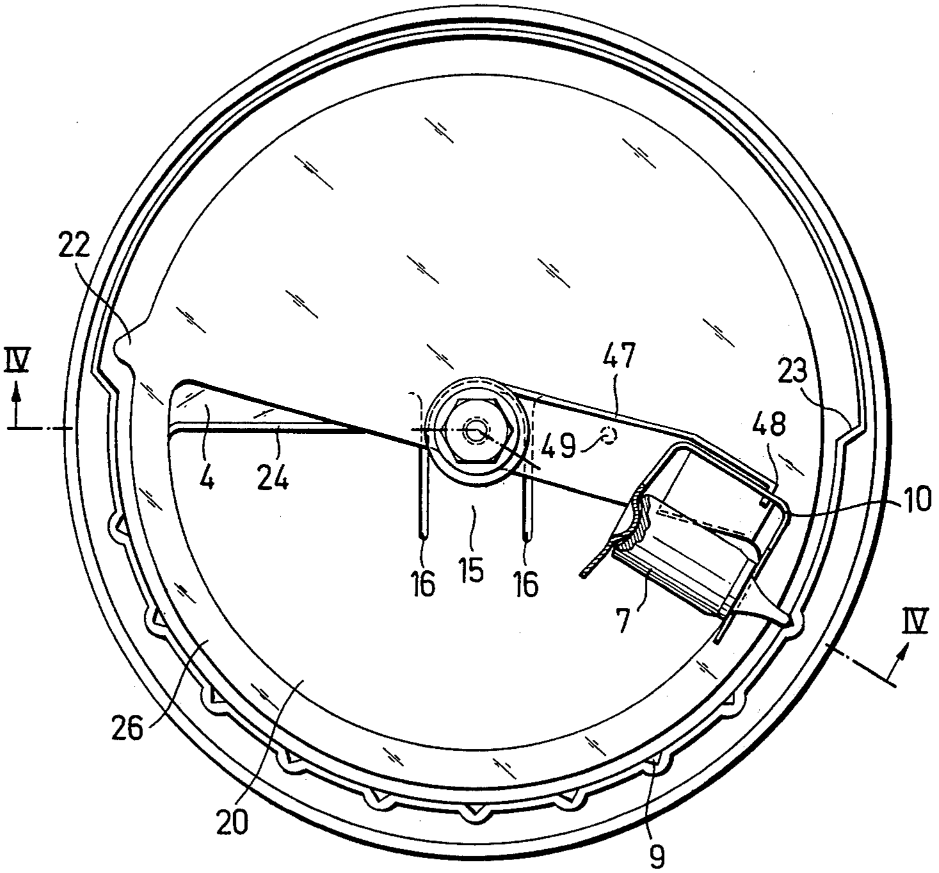
FIG. 3 shows a plan view of a second, particularly preferred embodiment of the invention with its cover cap removed, as in FIG. 1.

Referring first to the preferred embodiment of the invention shown in FIGS. 3–6, a cup-shaped valve housing 1 is provided with a base or bottom plate portion 13 which has a generally semi-circular aperture 12. Projected slightly inward of the aperture 12 from the center of the diametral edge portion thereof is the projected extremity of a spring strap 15 which includes a single bore or aperture the center of which lies in the longitudinal axis of the valve housing. The spring strap 15 is formed by cutting two parallel slits 16 in the bottom plate portion 13 to extend inwardly from the diametral edge of the aperture 12 in generally parallel relation so as to lie symmetrical to the longitudinal axis of the valve housing.

The peripheral wall of the cup-shaped housing 1, which rims its base or bottom plate portion 13, has a stepped, generally cylindrical configuration. The stepped configuration of the peripheral wall of the housing 1 forms in its inner surface a radial shoulder 11 as the interior cross sectional dimension of the housing 1 is expanded at the mouth thereof.

Extending transversely of the housing 1, in parallel axially spaced relation to its bottom plate portion 13, is a centrally apertured valve base plate 4. Peripheral to and forming an integral part of the plate 4 is a flange portion 25. The flange 25 is offset slightly from the central portion of the plate 4 and positions to overlie and abut the inner peripheral portion of the shoulder 11. When the plate 4 is installed, both its flange 25 and the underlying shoulder 11 are deformed to create therein similar offsets one of which nests within and interlocks with the other. The offset in the shoulder 11 provides a recess or dimple 18 seating a detent 17 created by the offset in the flange 25.

The valve base plate 4 includes a semi-circular aperture 6. With the plate 4 properly installed, the aperture 6 is located in a position which is circularly offset 180° from the position of the aperture 12 in the axially spaced base plate 13.

Figure 4:
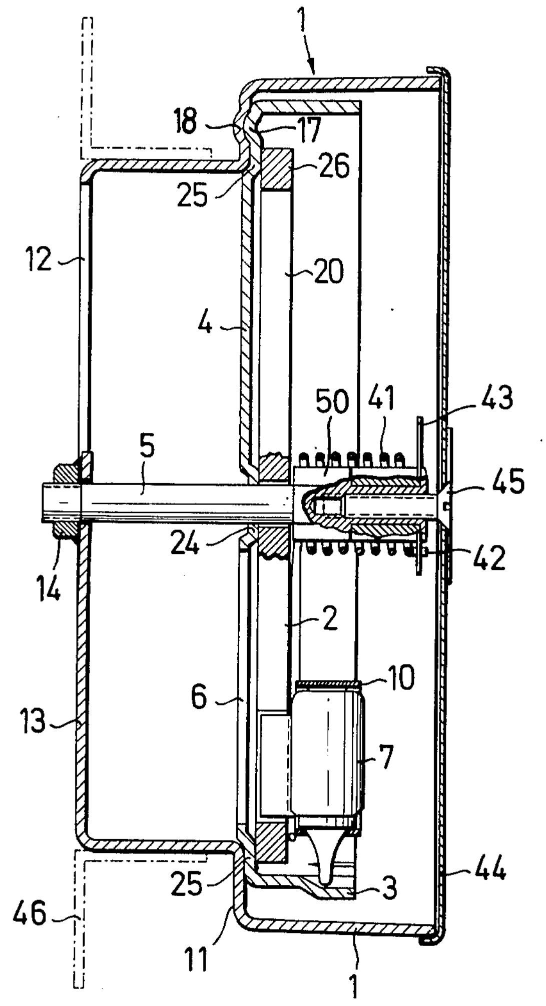
FIG. 4 is a sectional view taken on line IV—IV of FIG. 3.
Figure 5:
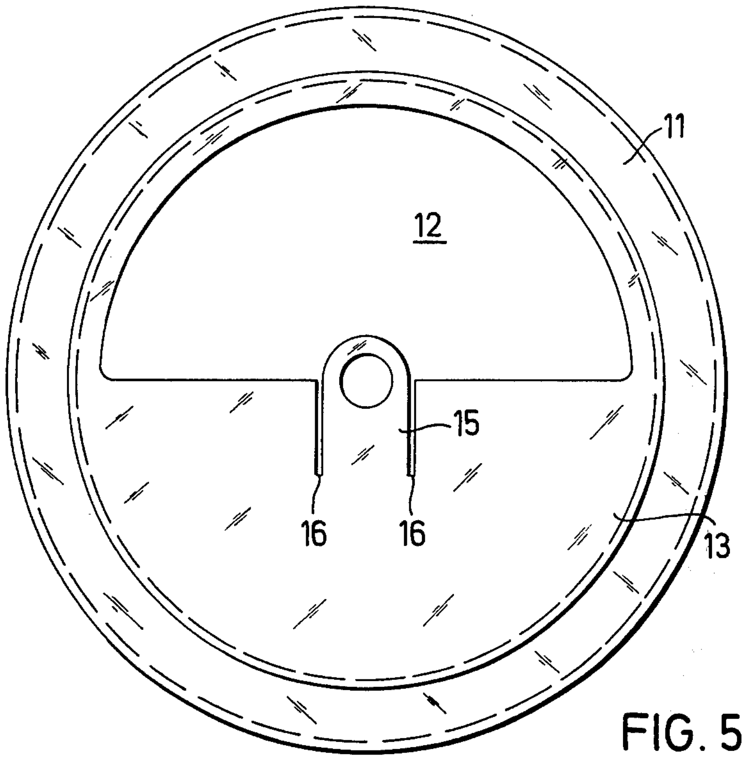
FIG. 5 is an end view of the housing included in the ventilator valve of FIG. 3.
Figure 6:
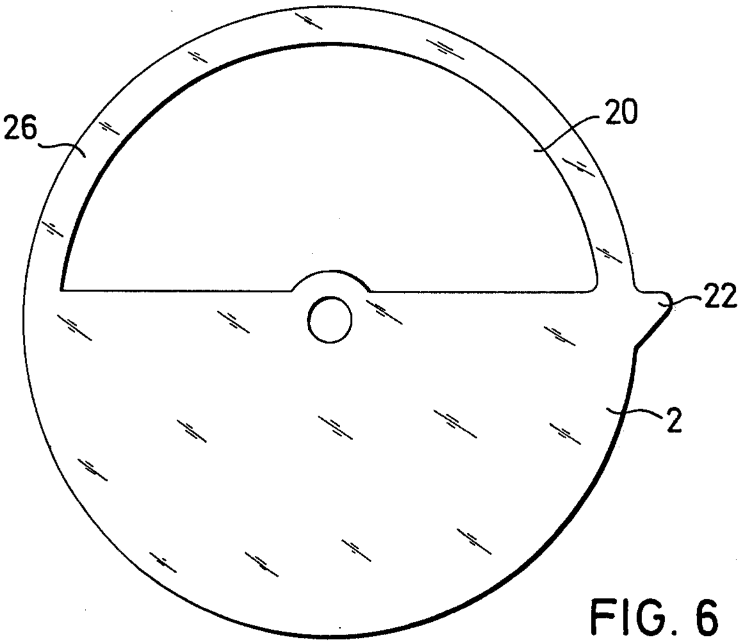
FIG. 6 is a plan view of an apertured disc forming the valve plate of the invention embodiment of FIG. 3.

Formed integral with and to be generally perpendicular to the outer peripheral edge portion of the flange 25 is a ring-like structure 3. As seen in FIG. 4, as installed the central portion of the valve base plate 4 positions in a slightly nested relation to the bounding inner peripheral edge of the shoulder 11, which is overlapped by the flange 25, and the ring structure 3 extends in a generally concentric relation to the longitudinal axis of the valve housing 1, towards the mouth of its cup-like form.

The inner peripheral wall surface of the ring structure 3 has approximately 180° of its 360° arcuate extent radially offset to lie slightly inward of the arc defined by the other substantially 180° thereof. Thus, one-half of this peripheral wall surface is formed on a larger radius than the other half and its circumferential limits is by reason of the offset bounded by shoulders 23 providing limits or stops the purpose of which will be further described. Beyond the shoulders 23, the 180° portion of the inner wall surface of ring structure 3 which is formed on a smaller radius includes therein a series of circularly spaced notches or recesses 9.

Fixed to project through the bore in the projected extremity of the spring strap 15 in the center of the base plate 13, to project interiorly of and in the central longitudinal axis of the housing 1 is a journal 5. The end of the journal 5 which is exterior to the base 13 is threaded and threadedly engaged in a nut 14. As the journal 5 extends toward the mouth of the housing 1, it first projects through the central aperture in the plate 4 and immediately beyond the plate 4 it projects through a central aperture in an overlying disc 2 the outer peripheral edge of which has a generally circular configuration. Formed in the disc 2 is a generally semi-circular hole or aperture 20 the radius of which is less than the radius of the disc 2. The radius of the disc 2, in turn, is less than that upon which either of the 180° segments of the inner wall surface of the ring structure 3 is formed. The disc 2 thus has a dimension permitting it to nest within the ring structure 3 and to bear on its base plate 4 for rotation about the journal 5. Projected radially and outwardly of the circular outer edge of the disc 2, substantially at the end of a diametral line thereof which is immediately adjacent and parallel to the diametral edge of the hole 20 is a lug 22. As will be seen in FIG. 3 of the drawings, as the disc 2 is assembled to the journal 5 and in overlying relation to the plate 4 which provides its base, the lug 22 will lie within that 180° portion of the inner wall surface of the ring structure 3 which is formed on the larger radius. The arrangement is such, accordingly, that the engagement of the lug 22 with one of the shoulders 23 will define a rotary position of the disc 2 wherein the solid portion thereof is in capping relation to the aperture 6 in the base plate 4. The aperture 6 is peripherally bounded by an offset of a portion of the plate 4 which is of semi-circular line configuration to produce thereon a semi-circular rib or web 24. This rib or web projects in the direction of and provides, as will be seen, a bearing surface for the valve plate which is provided by the disc 2. When the disc is in capping relation to its base plate 4, the arrangement provides that the 180° arcuate portion of the rib or web 24 is positioned in immediate backing relation to an outer peripheral edge portion of the disc 2. At the same time the diametrally extending portion of the rib or web 24 is arranged to underlie a portion of the disc 2 which defines the diametral edge of the hole 20.

It will be understood that as the hole 20 is positioned its arcuate peripheral edge portion is bounded by an arcuate segment of an annular outer edge portion of the disc 2 the arcuate extent of which will continuously overlie the arcuate portion of the rib or web 24 and the flange 25.

Immediately beyond the disc 2, as it extends toward the mouth of the cup-shaped housing 1, the journal 5 is surrounded by a helicoidal spring 41. One end 42 of the spring 41 is anchored in a disc 43 suitably contained by means at the projected extremity of the journal 5 within the mouth of the housing 1. The disc 43 is related to said containing means in a manner to inhibit its rotation about the journal 5. The other end of the helicoidal spring 41 which abuts the outer face of the disc 2 extends outward from the journal 5 to form a generally radially extended spring arm 47. The projected extremity of the arm 47 is formed as a hook 48 which engages in the bridging portion of a generally U-shaped stirrup 10. The stirrup 10 is edge mounted to project from the face of the disc 2 which is outermost from its base plate 4 and at a position thereon which is approximately diametrically opposite the edge portion of the disc which incorporates the lug 22. The legs of the stirrup 10 have a spring-like character and project in a direction to overlie, at least in part, the hole 20. The one leg of the stirrup 10 which is radially innermost on the disc 2 is formed to produce therein a projected detent arranged to seat in a recess provided in the base of a bursting cartridge 7. The opposite end of the cartridge 7 is conically reduced and thrust through an aperture in the other leg of the stirrup 10 to have its projected extremity normally be selectively positioned in one of the notches 9 in the inner wall surface of the ring member 3. Noting FIG. 3, the bursting cartridge as so positioned is oriented in a sense radial to the disc 2, the ring structure 3 and correspondingly the peripheral wall of the housing 1.

The helicoidal spring 41 is pre-tensioned so that when engagement of the bursting cartridge 7, constituting a locking element, in a notch 9 is disabled or cancelled it will serve to automatically induce a rotation of the disc 2 providing thereby that the disc 2 serves as a valving plate which completely caps and seals the aperture or passage 6 in the base plate 4 and thereby the flow passage through the housing 1. The closing movement of the disc 2 will be limited by the engagement of the lug 22 with the shoulder 23 shown at the right hand side of the ring structure 3 in FIG. 3 of the drawings.

Referring to FIG. 4, a bore is provided in the end of the journal 5 which lies within the mouth of the housing 1. This bore has the wall thereof provided with a screw thread into which is engaged a screw 45 thrust through an aperture in the center of a flow grille 44 bridging the projected extremity of the peripheral wall which defines the mouth of the housing 1. The grille 44 is apertured for the free flow therethrough of air which passes to and through the housing 1. As will be seen, as the screw 45 is moved inwardly of the journal 5 the head thereof will bias the center of the outer face of the grille inwardly of the valve housing, simultaneously drawing the flanged outer peripheral edge of the grille into a tightly engaged relation to the wall structure of the housing to which it seats.

Attention is directed to the fact that there is a sleeve-type structure 50 provided about the journal 5 which extends from the outer face of the disc 2 to the disc 43 and lies within the confines of the helicoidal spring 41.

With the construction as described with reference to the journal 5 and the elements associated therewith, on the one hand there can be an adjustment of the relative positions of the projected extremity of the journal 5 and the nut 14 producing a pretensioning of the spring strap 15 and a containment of the disc 2 with reference to its base plate 4 which, while permitting the free rotation of the valve plate provided by the disc 2, causes the disc 2 to be maintained in bearing relation to the flange 25 and the web 24. This precludes any unbalance or tilting movement in the disc or loss of seal in the event of the disc 2 should in the course of the use of the invention valve unit be rotated. A further control is of course provided by the degree to which the screw 45 is threaded into the journal 5, a direct consequence of which is to draw the sleeve 50 to end abutted bearing relation to the disc 2 about its central aperture. It is very important to note that the arrangement provides a double safety to insure that when the disc 2 is in closing relation to the aperture 6 the seal effected thereby will not be lost should the tension effect of the spring 41 be lost by annealing in the presence of a fire in the building in which the valve is incorporated.

The use and function of the valve of the invention a preferred embodiment of which is illustrated in FIGS. 3 to 6 is believed obvious from a view of FIG. 3. As there shown a bursting cartridge 7 is in place in the stirrup 10 and its tip 8 is lodged in a recess 9 in the ring structure 3. Under such conditions as shown the disc 2 is positioned so that the major portion of the hole 20 therein is in line with the aperture 6 in the base plate 4. At the same time the aperture 12 in the base 13 of the valve housing 1 is always open. Under such circumstances there will be a full and free flow of air through the flow passage defined in the housing 1, the amount of air passed being determined by the extent to which the passage defined by the aperture 6 is uncovered. Of course, the extent the aperture 6 is uncovered will be determined by the location of the notch 9 in which the tip 8 of the bursting cartridge is engaged. The plurality of notches 9 provide for a selective rotational position of the hole 20, thus determining the flow of air through the housing 1 as circumstances require. Particular attention is directed so the fact that the aperture 6 and the aperture 12 are not only axially spaced, as to the planes in which they lie, but the apertures are so disposed as to be relatively displaced 180° , in a circular sense. This dictates that there will be a deflection of the air stream moving through the valve housing from one aperture to the other. The result is of significance. The arrangement does in fact eliminate the objectionable noise characteristics normally found in the use of prior art ventilator valves during an opened condition thereof.

In the case of fire in a building in which the ventilator valve is used, the temperature of the environment of the valve will soon reach that level which will cause the bursting of the cartridge 7. When this occurs, the cartridge 7 will be obviously disabled and there will no longer be an engagement of the tip 8 thereof in a notch 9 of the ring structure 3. With the bursting of the cartridge 7 there will accordingly be an immediate rotation of the disc 2 under the influence of the biasing arm 47 of the helicoidal spring 41. This bias is transmitted to the disc 2 through the medium of the interconnected stirrup 10 and the degree thereof will be sufficient to achieve a rotation of the disc 2 sufficient to cap the aperture 6. As previously described, the disc 2 will be prevented from rotating past its capping position by engagement of the lug 22 to the shoulder 23 in the path of its movement. Also as previously described, during the rotational movement of the disc 2, as it serves as a valving plate moving to a closed position, the embodiment thereof as seen in FIG. 3 of the drawings insures that the entire circumferential annular portion of the disc including that bounding the hole 20 at the arcuate edge portion thereof will bear on the flange 25 and correspondingly on the web 24. Since the web 24 includes the diametrally extending portion bounding the diametral side of the aperture 6 there will be full balance and not tilting movement of the disc 2 during the closing process. Moreover, the double safeties included for containment of the disc 2 as described insures a sealing contact as between the disc 2 on one hand and the flange 25 and the web 24 on the other hand. It is insured in the use of this ventilator valve of the invention as described with reference to FIGS. 3–6 that the closing and seal of the aperture 6 and thereby of the flow passage through the ventilator housing 1 will be positive irrespective of the orientation of the valve housing in the installation thereof. The valve plate or disc 2 will be rendered fully operative even if it is so positioned to require its rotation in a horizontal plane. The fact that the valving disc 2 has a full annular edge portion at its outer periphery is of considerable advantage since it avoids need for concern of a gravity component which may cause the tilting of the disc if it were merely of semi-circular configuration and embodied in a construction such as utilized in prior art valves of a similar nature.

FIG. 3 illustrates also, in dotted line, a possible modification of the above described embodiment of the invention. As seen, a stop pin 49 may be fixed to project perpendicular to the disc 2 and the spring arm 47 may be arranged to be shortened and to provide a bias against the stop pin 49 rather than the stirrup 10. In such event when the cartridge 7 is burst as a predetermined level of the temperature of its environment, such as produced by fire, is reached, then the disc or valve plate 2 will be automatically rotated to a position in which it closes the aperture 6 through the medium of the bias on the pin 49 rather than the stirrup 10.

Certain important points of advantage should be clearly obvious from the foregoing.

Figure 7:
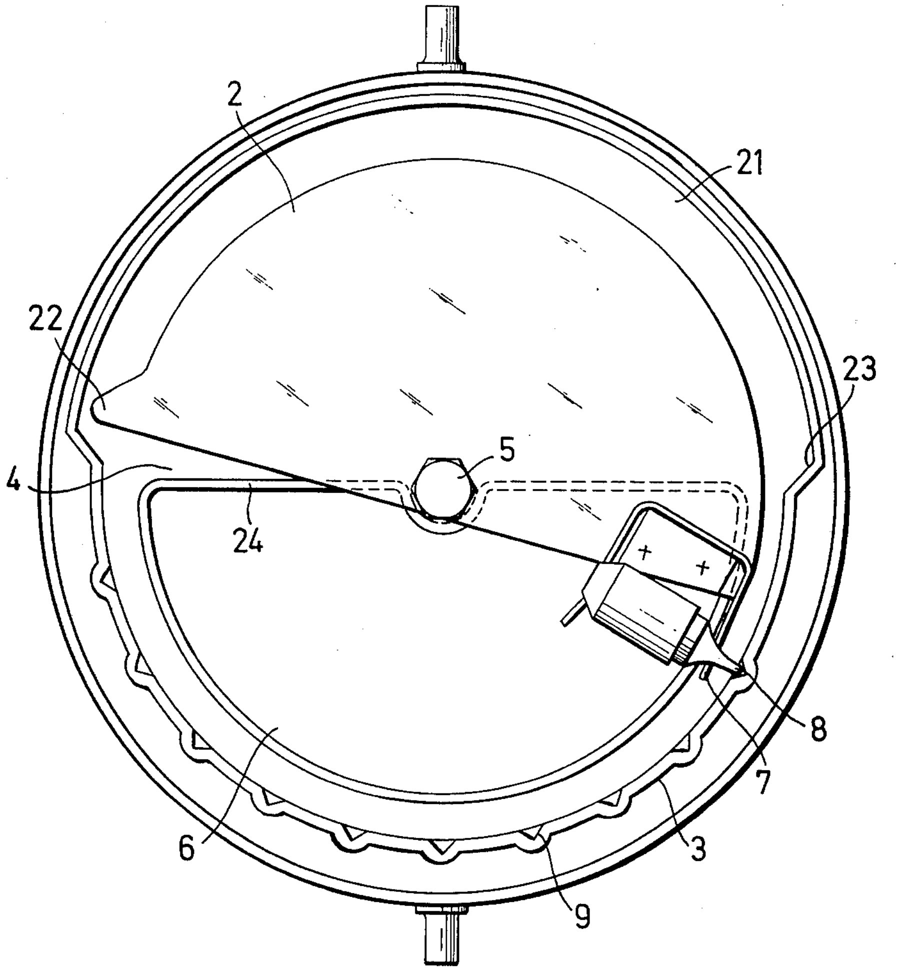
FIG. 7 is a view similar to that shown in FIG. 3 illustrating a third embodiment of the present invention.

Whereas the embodiment illustrated in FIGS. 3 to 6 is suitable for installation both in ceilings and in vertical walls, the embodiment of FIG. 7 serves solely for installation in vertical walls. The latter differs from the embodiment of FIGS. 3–6 only in that the closure spring 41 is absent. As seen, in the open position of the valve the disc 2 lies in a substantially vertical plane and is so arranged that its center of gravity lies outside and to one side of its rotational axis. Thus, when the cartridge 7 is exposed to an excessive temperature and it bursts to disable the locked or fixed open condition of the disc 2, the disc will be rotated to a closed position under the influence of the force of gravity. With the arrangement provided the closed position will correspond to the equilibrium position of the disc 2, at which it will be stopped, in any event, in view of the fact that the lug 22 will come into abutment with the stop 23 as the closed position is reached. The advantages of the invention embodiment of FIGS. 3–6 other than that provided by the spring 41 are fully retained. The remarks in respect thereto are therefore equally applicable to the embodiment of FIG. 7.

FIGS. 1 and 2 of the drawings disclose a further though less preferred embodiment of the invention. A number of parts of this embodiment are similar to those illustrated in the embodiment of FIGS. 3–6. Such similar parts include the cup-shaped housing 1, the valve base plate 4 including its peripheral flange 25 and, integral therewith, the ring structure 3, and the journal 5 mounted to the base plate 13 and projected interiorly of the housing 1. Such parts are constructed and associated as previously described. One difference in this embodiment, evidenced in FIG. 1, is that the valving plate or disc 2 has only a semi-circular configuration, though it embodies the lug 22 as an extension of one end of its diametral edge portion and mounts the stirrup 10 and bursting cartridge 7 at one face thereof adjacent its opposite diametral end in a form and in a manner as previously described. As seen in FIG. 1, also, the valving plate provided by the semi-circular disc 2 is held in a valve open position by the engagement of the tip 8 of the cartridge 7 in a selected notch 9 in the ring structure 3, the particular location of the notch 9 determining the flow cross section of the aperture 6.

A further difference in the embodiment of FIG. 1 is that it employs a spiral spring 31 about the journal 5 rather than the helicoidal spring 41. The spring 31 is located at the outer face of the semi-circular disc 2 and has one end 32 thereof fixed or anchored to the journal 5 per se while the other end which projects in a sense generally radial to the journal 5 is formed into a triangle 33. The side edge portion of the triangle 33 is braced against the disc 2 to bias it in an axial direction which causes it to be pressed against the flange 25 and that portion of the web 24 which it overlies at any one time. Further, the base of the triangle 33 is abutted to the base of the stirrup 10 and through the medium thereof produces a bias against the stirrup 10 which will apply thereto a rotational influence on bursting of the cartridge 7 and the disabling of its engagement in one of the notches 9 in the ring structure 3. Thus, when the bursting of the cartridge 7 does occur there is sufficient pretensioning of the projected end 33 of the spring 31 to cause the disc 2 to immediately rotate into a position to cover and close the aperture 6. The amount of tension is such that in the process the lug 22 will come into contact with the stop 23 in its path, against which stop the lug will be maintained to thereby maintain the disc 2 firmly in its valve closed position. As noted, the side bias of the triangular end portion of the spring 31 against the outer face of the disc 2 which provides the valving plate maintains it in bearing relation to the flange 25 and the rib or web 24 the nature of which was described with reference to the embodiment of FIGS. 3–6. Moreover, as the semi-circular disc 2 of the embodiment of FIG. 1 is in a valve closed position its diametral edge will be positioned to overlap the diametral edge portion of the web 24.

While the embodiment of FIGS. 1 and 2 will be satisfactory for certain applications, it, as will be apparent, does not have all the advantageous features of the preferred embodiment of FIGS. 3–6. This should be self-evident since it does not have the full circular configuration of the valving disc of this preferred embodiment of the invention and the attendant advantages described.

It should be understood that whether the spiral spring 31 or the spring 41 is employed the pre-tension will be sufficient and generally more than necessary to maintain the disc 2 in the closed position which is determined by the engagement of the lug 22 with the shoulder or stop 23 in its path as the valve automatically functions to achieve its closed condition.

It is noted that in the embodiment of FIGS. 1 and 2 as well as that of FIGS. 3–6 the slits 16 in the base 13 of the housing 1 may be eliminated. Adequate pretension effect still may be achieved as previously described and particularly on the relative rotation of the threaded extremity of the journal 5 and the nut 14.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specifc as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

The embodiments of the invention in which an exclusive property or privilege is claimed are defined as follows:

1. A ventilator valve comprising a housing, means defining a flow passage through said housing at least a portion of which is defined by an aperture in a plate incorporated in said housing, a valve plate mounted for rotation in a plane adjacent to the plane of said plate which includes said aperture, said valve plate having at least one aperture adapted to be selectively positioned with respect to the aperture in said first mentioned plate, means for mounting a locking element in connection with said valve plate, for rotation therewith, means having a relatively fixed relation to said housing including a plurality of arcuately spaced anchoring means adapted to be selectively engaged by the locking element whereby to position a selected portion of said one aperture in said rotatable plate in alignment with a selected portion of the aperture in said first mentioned plate, the locking element mounted in connection with said valve plate and the anchoring means to which it is engaged being arranged to disengage in the presence of a predetermined level of the temperature of their environment, and said rotatable plate being conditioned to move to a position to close said aperture in said first mentioned plate upon a disengagement of the locking element from its anchoring means.

2. A ventilator valve as in claim 1 characterized in that said anchoring means are embodied in an arcuate wall structure fixed peripherally of a peripheral portion of said aperture in the first mentioned plate and concentric with the axis of rotation of said rotatable plate.

3. A ventilator valve as in claim 2 wherein spring means having a biasing connection to said valve plate provide the means which condition said rotatable plate to close said aperture in said first mentioned plate, upon a disengagement of the locking element from its anchoring means.

4. A ventilator valve as in claim 2 characterized in that said valve plate is formed and conditioned to move to a position to close said aperture in said first mentioned plate in response to the influence of gravity, upon a disengagement of the said locking element from its anchoring means.

5. A ventilator valve as in claim 1 characterized by a ring member connected with said housing to position about said aperture in said first mentioned plate, said ring member having in the inner wall surface thereof a plurality of recesses in spaced following relation to one another, said recesses providing said anchoring means in which the locking element may be selectively engaged.

6. A ventilator valve as in claim 1 characterized in that the aperture in said first mentioned plate is semi-circular in configuration and rimmed by an arcuate wall structure having a fixed connection to said housing and providing in connection therewith said anchoring means and said rotatable valve plate is mounted within said housing in a spaced, adjacent, generally parallel relation to said first mentioned plate and within the boundary defined by the line of said arcuate wall structure.

7. A ventilator valve as in claim 6 characterized in that said rotatable plate has a generally circular outer peripheral edge and includes thereon a lug-like projection cooperation with stop means provided in connection with said arcuate wall structure, upon rotation of said rotatable plate, as the locking element is disengaged from its anchoring means, to define the position in which said valve plate will close the aperture in said first mentioned plate.

8. A ventilator valve as in claim 6 characterized by a third plate in connection with said housing which is axially spaced from and axially aligned with said first mentioned plate, said third plate also having a semicircular aperture which is displaced 180°, in a circular sense, from the semi-circular aperture in said first mentioned plate and said rotatable valve plate is positioned to the side of said first mentioned plate which is remote from said third plate and mounts for rotation in a plane closely adjacent to the plane of said first mentioned plate.

9. A ventilator valve as in claim 8 wherein a journal extends through said plates and provides a base about which said rotatable plate may turn and a spring means is embodied in connection with said journal and to have one end portion thereof project from said journal and operatively engaged to means in connection with said rotatable plate to condition the same to rotate to a position to close said aperture in said first mentioned plate upon a disengagement of the locking element from its anchoring means.

10. A ventilator valve according to claim 9 characterized in that the aperture in said rotatable plate is a semicircular aperture lying within the boundary of an annular peripheral portion of said rotatable plate and means are provided in bounding relation to the aperture in said first mentioned plate forming a bearing for said rotatable plate as it moves to a position to close the aperture in said first mentioned plate.

11. A ventilator valve as in claim 1 wherein the aperture in said first mentioned plate is a substantially semicircular aperture, a ring-like member in said housing is located in a surrounding relation to said semi-circular aperture and has defined therein a plurality of circumferentially spaced recesses which open radially inward thereof, said rotatable valve plate includes at least a substantially semi-circular plate portion rotatably mounted in said housing in a plane parallel to said first mentioned plate and concentric to said ring-like member, said anchoring means being provided by the means which define said recesses in said ring-like member and said rotatable plate being conditioned by an operatively connected spring which has a predetermined tension to influence the rotatable plate to move to a position in which it closes said aperture in said first mentioned plate.

12. A ventilator valve according to claim 11 wherein means located on said semi-circular plate portion provides a stop against which an end portion of said spring bears to condition said rotatable plate for movement to said aperture closing position.

13. A valve according to claim 11 wherein a stop is provided on said ring-like member and a lug is provided on said rotatable plate, said stop being located in the path of said lug as said rotatable plate is rotated to a position in which it closes said aperture in said first mentioned plate, the engagement of said lug to said stop determining the closed position of said rotatable plate.

14. A valve according to claim 13 wherein a radial offset in said ring-like member provides said stop.

15. A valve according to claim 11 wherein said spring is a helicoidal spring wrapped around a journal for said rotatable plate, one end of which spring projects in a sense radial to said rotatable plate to engage means in connection therewith, said spring means being pre-tensioned to condition said plate for rotation whereby to close said aperture in said first mentioned plate upon disengagement of the locking element from its anchoring means.

16. A valve according to claim 11 wherein said spring is a spiral spring anchored to a journal for said rotatable plate and having a free end thereof biased against means in connection with said plate to condition the same for movement to a closed position.

17. A valve according to claim 11 including a journal for said rotatable plate having a fixed connection to said housing and said spring means is arranged around said journal to be anchored at one end and to have the other end thereof extend to apply a bias to rotate said rotatable plate upon disengagement of the locking element from its anchoring means.

18. A valve according to claim 17 characterized in that means are provided in connection with said journal and said housing arranged to apply a bias through said journal to cause said rotatable plate to be maintained in bearing relation to means in connection with said first mentioned plate as it rotates.

19. A valve according to claim 11 wherein said housing comprises a generally cylindrical outer wall and a base to one end thereof including a generally semi-circular aperture, said housing base having in connection therewith a journal which extends through said first mentioned plate and said rotatable plate, the latter of which rotates on and about said journal.

20. A valve according to claim 19 wherein said journal is connected to a portion of said base which comprises a spring strap extending between two parallel incisions in said base which open from the diametral edge of the semi-circular aperture therein.

21. A valve according to claim 11 characterized by said housing including a base having an aperture, the location of which is diametrically opposite the location of the aperture in said first mentioned plate.

22. A valve as in claim 11 characterized in that said rotatable plate which includes said semi-circular plate portion has an annular band at the outer peripheral edge thereof extended to form a circle encompassing a semi-circular aperture which is formed thereby in said rotatable plate.

23. A valve according to claim 1 characterized in that said housing includes a generally cylindrical wall structure including a base plate transverse to one end thereof, means defining a shoulder within and in connection with the inner wall surface of said wall structure, said shoulder being in a plane generally parallel to said housing base and spaced axially therefrom, an aperture in said housing base, said first mentioned plate being provided with a peripheral flange portion which is seated on and in fixed connection with said shoulder to dispose said first mentioned plate parallel to the base plate of said housing, a journal in connection with said housing having one end thrust through an aperture in the center of said housing base and the end portion exterior of said housing base threadedly engaged in a nut abutted to said base, said journal extending within said housing in the longitudinal axis of said wall structure, through said first mentioned plate and said rotatable plate to rotatably mount thereon said rotatable plate for movement in a plane adjacent and parallel to said first mentioned plate, and beyond said rotatable plate said journal being expanded by means to contain said rotatable plate in adjacent relative bearing relation with means in connection with said first mentioned plate and said conditioning means for said rotatable plate being provided by spring means contained about said journal anchoring to have one end project and bear against means included with said rotatable plate, thereby to apply a bias which conditions said rotatable plate to move to a position to close said aperture in said first mentioned plate when the locking element disengages from its anchoring means.

24. A valve according to claim 23 wherein an axial biasing influence is applied to said rotatable plate by by adjusting means in connection with said journal including said nut.

25. A valve according to claim 23 characterized in that said housing base plate has a semi-circular aperture which is diametrically opposite the location of the aperture in said first mentioned plate which is also semi-circular in configuration, and said rotatable plate has an aperture therein lying within the peripheral boundary thereof which is circular in configuration, and said aperture in said rotatable plate is also semi-circular in configuration.

26. A valve as in claim 25 characterized in that bearing means are provided between said rotatable plate and said first mentioned plate including a diametral web boundary the diametral edge of the semi-circular aperture in one thereby by means of which to insure a seal of said aperture in said first mentioned plate as it is closed by said rotatable plate.

* * * * *

UNITED STATES PATENT OFFICE
CERTIFICATE OF CORRECTION

Patent No. 4,060,096 Dated November 29, 1977

Inventor(s) Max Gunter Schade

It is certified that error appears in the above-identified patent and that said Letters Patent are hereby corrected as shown below:

Col. 2, line 24, "operations" should read -- operation --.

Col. 5, line 61, "so" should read -- to --.

Col. 6, line 28, "not" should read -- no --.

Col. 9, line 39, (Claim 7, line 4), "cooperation" should read -- cooperating --.

Col. 12, line 17 (Claim 24, line 3), "adjusting" should read -- adjustable --.

Col. 12, line 31 (Claim 26, line 4), "boundary" should read -- bounding --.

Col. 12, line 32 (Claim 26, line 5), "thereby" should read -- thereof --.

Signed and Sealed this

*Eleventh* Day of *April 1978*

[SEAL]

*Attest:*

RUTH C. MASON
*Attesting Officer*

LUTRELLE F. PARKER
*Acting Commissioner of Patents and Trademarks*